Dec. 13, 1966   I. E. LAMB   3,291,986
MONITOR FOR AIR-BORNE BERYLLIUM
Filed Aug. 13, 1962

INVENTOR.
IRVIN E. LAMB
BY
ATTORNEY

United States Patent Office 3,291,986
Patented Dec. 13, 1966

3,291,986
MONITOR FOR AIR-BORNE BERYLLIUM
Irvin E. Lamb, Berkeley, Calif., assignor, by mesne assignments, to Aerojet-General Corporation, El Monte, Calif., a corporation of Ohio
Filed Aug. 13, 1962, Ser. No. 216,390
11 Claims. (Cl. 250—83.3)

This invention relates to monitors for air-borne particles generally, and more particularly to a continuous monitor for air-borne beryllium or like particles.

The highly toxic character of finely powdered beryllium when absorbed into the human body requires that efficient means be provided for the instantaneous detection of even minute quantities of air-borne beryllium particles. An extremely small concentration of beryllium in air, on the order of 2 micrograms per cubic meter, can cause a multiplicity of ailments. The increasingly widespread use of beryllium particularly in the atomic energy industry, has served to heighten this problem.

Presently, the most common methods employed for the monitoring of air-borne beryllium particles, consist of the collecting of an air sample and the subsequent analysis of the sample. Analysis of the sample can be made by either a chemical analysis, fluorometric or calorimetric means, or an emission spectrograph. The air samples are of necessity taken at various time intervals and there is generally a considerable delay between the time when the sample is taken and the time when the results of its analysis are known. Therefore, an increase in the amount of air-borne beryllium could go unnoticed and undetected for a considerable length of time and cause numerous physical injuries during the interim.

Recent developments have employed filter paper to collect air-borne beryllium from the air. The filter paper is then exposed to an alpha particle flux. The beryllium present, if any, on the filter paper will react with the alpha particles whereby the beryllium emits neutrons and gamma rays. By measuring the yield of neutrons and/or gamma radiation with a scintillation counter, the amount of beryllium present on the filter paper can be determined. This method considerably reduces the time between the taking of the sample and the results of the analysis thereon. It is still, however, an intermittent detection means.

Therefore, the principal object of the present invention is to provide a continuous monitor for air-borne particles such as beryllium.

Another object of this invention is to provide an instantaneous indication of the amount of beryllium or like particles in the air.

In its principal aspect the present invention comprises means for collecting air-borne particles arranged integrally with a source of radioactive particles reactive with beryllium. The radioactive particles react with any beryllium present in the collection means, producing secondary radiation proportional to the amount of beryllium collected. The secondary radiation can be converted into an electrical signal by means of a suitable detector. This electrical signal will be received by an electronic counter and will indicate the total amount of beryllium collected. An electrical differentiating circuit acting upon the electrical signal from the detector will produce a second signal proportional to the rate at which the beryllium is collected, thus giving an indication of the amount of beryllium in the air at a given instant. The signal from the counter and differentiating circuit or either of them can be recorded or used to actuate an alarm when a dangerous amount of beryllium is present in the air.

These and other objects, advantages, and features of this invention will be apparent to those skilled in the art from the following description taken together with the appended drawing wherein.

Figure 2:
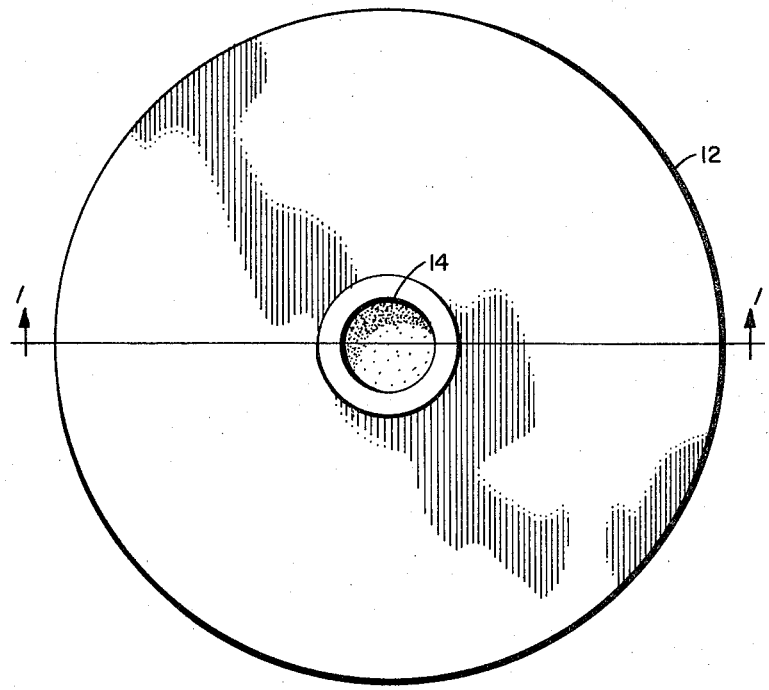
FIGURE 2 is a top plan view of the device illustrated in FIGURE 1.
Figure 1:
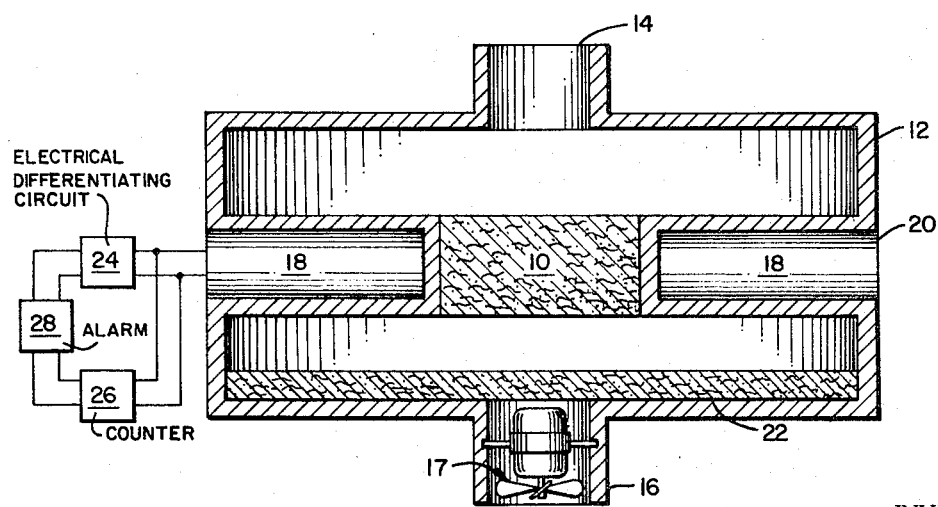
FIGURE 1 is a section taken on line 1—1 of FIGURE 2 showing the preferred embodiment of the continuous air-borne beryllium monitor.

Referring now to FIGURE 1, there is provided a combined alpha source and filter 10 contained within an air-tight housing 12 formed of plastic, wood, metal or other structural material having sufficient strength to maintain a seal, and which will not produce secondary radiation when exposed to radioactive particles. The combined alpha source and filter 10 is constructed to provide a very large surface area and to allow the passage of air therethrough, yet it collects any particles borne by the air. A suitable filter or particle collector can be fabricated from a sintered metal such as plutonium or its oxide, or from a controlled alloy or a metalloceramic type. A suitable alpha emitting material such as polonium-210 curium-242, radium or plutonium may be incorporated into the filter to provide a source of alpha particles integral with the filter and dispersed throughout. As an alternative, the alpha particle source material may be plated or electrodeposited upon the filter. The air tight housing 12 is provided with an inlet 14 and outlet 16. Air to be monitored enters the housing 12 through the inlet 14, passes through the filter 10 where any air-borne particles are deposited, then passes out of the housing through the outlet 16. The air is drawn through the housing 12 by means of a blower 17 connected to the air housing outlet 16. To prevent the escape of alpha contamination from the housing, an ultra filter 22 of CWS #6 Cambridge Media can be placed at the outlet 16.

If any beryllium particles are present in the air-borne particles collected by the filter, they will react with the alpha particles in the filter according to the following reaction:

abbreviated

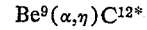

where $Be^9$ represents a beryllium atom
$\alpha$ represents an alpha particle
$\eta$ represents a neutron, and
$C^{12*}$ represents a carbon-12 atom (excited state).

The reaction of the beryllium particles with the alpha particles results in the formation of carbon-12 atoms, about 60% of which are in the excited state, and the emission of a neutron. The excited state carbon-12 atom will decay immediately to the ground state by emitting a 4.43 mev. gamma photon. This decay can be represented as:

where $C^{12*}$ represents a carbon-12 atom (excited state) $\gamma$ represents a gamma photon, and
$C^{12}$ represents a carbon-12 atom (ground state).

Thus the net result of the alpha-beryllium reaction is the formation of a carbon-12 atom and the emission of gamma photons and neutrons. The reaction is represented by:

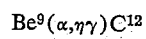

The effective gamma yield from a system using the combined alpha source and filter 10 will be higher than the yield from a system where the alpha source and filter are separate. Alpha particles of even high energies are readily stopped by very thin sections of solid materials. Thus, when the alpha source is merely placed over the filter, gamma production is primarily limited to the top layer of the filter. In effect, the area of alpha interaction with the beryllium to produce gamma radiation is equal to the surface area of the alpha source or the filter but is no larger than the smaller of the two.

When the alpha source is an integral part of the filter, as in the present invention, a different situation exists. The particles of beryllium that penetrate to the interior of the filter will be completely surrounded by the alpha source. Thus, the effective gamma production area becomes the entire free surface area of the filter, including the interior surfaces. Since the gammas emitted from the $Be^9(\alpha, \eta\gamma)C^{12}$ reaction have energies of 4.43 mev. the thickness of the filter may be quite large without noticeably impairing the gamma detection efficiency.

The yield of gamma photons and/or neutrons from the alpha-beryllium reaction can be measured by placing suitable detectors 18, shown schematically in FIGURE 1, adjacent to the lateral surfaces of the combined alpha source and filter 10. Sealed wells 20 are provided in the air tight housing 12 to receive the detectors 18. A sodium-iodide (T1) crystal coupled with a photoelectric tube (not shown) is a suitable detector. The sodium-iodide (T1) crystal will convert the gamma rays into light pulses which in turn would be converted into electrical pulses by the photoelectric tube. The electrical signal comprised of the electrical pulses, is therefore an indication of the amount of beryllium present on the combined alpha source and filter 10; as the amount of beryllium on the filter increases, the number of the electrical pulses will correspondingly increase. Thus, the rate at which the electrical signal changes with time will indicate the amount of beryllium in the air passing through the filter. Assuming that there is no beryllium in the air passing through the filter, the electrical signal from the detector would be constant. Letting V represent the electrical signal and $t$ represent time, then this situation can be represented as $V=$ a constant or the change of the signal V with respect to time $t$, $dV/dt=0$. Thus, if some beryllium then appears in the air passing through the filter, the signal will no longer be a constant and $dV/dt$ will have a positive value.

Next assume that there is a constant amount of beryllium in the air passing through the filter, $dV/dt$ would then be a constant. If the amount of beryllium in the air increases, $dV/dt$ will likewise increase; if the amount of beryllium in the air decreases, $dV/dt$ will also decrease. Therefore, $dV/dt$ is directly proportional to the amount of beryllium in the air passing through the filter.

The electrical signal V can be read by a standard electronic counter 26 shown schematically in FIGURE 1 and will be an indication of the total amount of beryllium collected. By taking the differential of the signal V with respect to time by means of an electrical differentiating circuit 24, also shown schematically in FIGURE 1, a new signal will be obtained which indicates the rate at which air-borne beryllium is collected. In this manner, the amount of beryllium in the air is continuously monitored and an instantaneous indication of the amount present is given. The signals from the counter 26 and differentiating circuit 24 can be recorded or fed into a conventional alarm indicated schematically at 28 adjusted to be actuated when the indicated beryllium content in the air exceeds a predetermined permissable amount. The theory of operation and construction of electrical differentiating circuits will be found on pages 621 through 625, "Electronic and Radio Engineering," Terman, fourth edition, McGraw-Hill Book Co., Inc.

Although the invention has been described as a monitor for air-borne beryllium, it is to be understood that it may be used for the detection of lithium, boron, fluorine as well as a few other light elements. Also, this device may be utilized to detect any of these elements in fluids other than air. For example, the device may be used to detect or measure the quantities of these elements in gases or fluids being processed or used in industrial applications.

While a number of details of construction and alternate embodiments have been illustrated and described, alternatives and equivalents will occur to those skilled in the art which are within the scope and spirit of this invention. It is, therefore, desired that the protection be not limited to the details here illustrated and described but only by the proper scope of the appended claims.

I claim:

1. A monitor for air-borne beryllium or the like comprising: means for filtering particles from the air having an air permeable filter element disposed therein, and a source of radioactive particles integrally dispersed within said air permeable filter element whereby the radioactive particles from said source react with the beryllium collected upon and within said filter element producing secondary radiation proportional to the beryllium collected.

2. A monitor for air-borne beryllium or the like as described in claim 1 wherein said source of radioactive particles is an alpha particle source whereby the reaction with beryllium produces neutrons and gamma rays.

3. A monitor for air-borne beryllium or the like comprising: means for filtering particles from the air having an air permeable filter element disposed therein, an alpha particle source integrally dispersed within said air permeable filter element whereby alpha particles from said source react with the beryllium collected upon and within said filter element producing secondary radiation proportional to the beryllium collected, and detector means associated with said filtering means for receiving said secondary radiation and producing a signal proportional thereto.

4. A monitor for air-borne beryllium or the like as described in claim 3 and in addition, signal differentiation means to differentiate said signal with respect to time and establish a second signal proportional to the rate at which the air-borne beryllium is collected.

5. A monitor for air-borne beryllium or the like as described in claim 3 and in addition, signal read out means to indicate the cumulative amount of air-borne beryllium collected.

6. A monitor for air-borne beryllium or the like as described in claim 4 wherein said signal differentiation means comprises an electrical differentiation circuit.

7. A monitor for air-borne beryllium or the like as described in claim 4 and in addition, alarm means associated with said signal differentiating means actuated when said second signal reaches a predetermined level indicating a dangerous level of air-borne beryllium in the air.

8. A monitor for air-borne beryllium or the like as described in claim 5 and in addition, alarm means associated with said signal read out means actuated when said signal reaches a predetermined level indicating a dangerous level of air-borne beryllium in the air.

9. A monitor for air-borne beryllium or the like comprising: an air tight housing, means for drawing air through said housing, an air permeable filter disposed within said housing to collect beryllium from the air drawn through said housing, and a source of radioactive particles integrally dispersed within said filter whereby the radioactive particles from said source react with the beryllium collected upon and within said filter to produce secondary radiation proportional to the beryllium collected.

10. A monitor for air-borne beryllium or the like comprising an air tight housing, a blower for drawing air through said housing, a filter arranged in said housing for filtering particles from the air drawn through said housing, an alpha particle source integrally dispersed within said filter, alpha particles from said source being reactive with beryllium to produce gamma rays proportional to the beryllium collected, detector means receiving said gamma rays and producing an electrical signal proportional thereto, signal differentiation means to receive said electrical signal and differentiate same with respect to time producing a second signal proportional to the rate at which the air-borne beryllium is collected, and alarm means actuated when said second signal reaches a predetermined level indicating a dangerous level of air-borne beryllium in the air.

11. A monitor for air-borne beryllium or the like comprising an air tight housing, a blower for drawing air through said housing, a filter arranged in said housing for filtering particles from the air drawn through said housing, an alpha particle source integrally dispersed within said filter, alpha particles from said source being reactive with beryllium to produce gamma rays proportional to the beryllium collected, detector means receiving said gamma rays and producing an electrical signal proportional thereto, signal read out means to indicate the cumulative amount of air-borne beryllium collected, and alarm means actuated when said signal reaches a predetermined level indicating a dangerous level of air-borne beryllium in the air.

References Cited by the Examiner

UNITED STATES PATENTS

| | | | |
|---|---|---|---|
| 1,208,806 | 12/1916 | Loyer | 250—44 |
| 3,019,342 | 1/1962 | Brooke | 250—44 X |
| 3,154,682 | 10/1964 | Hartz et al. | 250—83.6 X |

OTHER REFERENCES

An Instrument for Monitoring Air-Borne Beryllium, by Haffner et al., from Transactions of the American Nuclear Society, 1962 annual meeting, June 18–21, 1962, vol. 5, No. 1, June 1962, page 199.

Measurement and Control Methods Using Radiation, by L. Reiffel, from Proc. of the Second United Nations International Conference on the Peaceful Uses of Atomic Energy, vol. 19, pp. 278–287, published by United Nations, Geneva, 1958.

RALPH G. NILSON, *Primary Examiner.*

ARCHIE R. BORCHELT, *Assistant Examiner.*